(12) United States Patent
Gillies et al.

(10) Patent No.: US 9,280,778 B2
(45) Date of Patent: Mar. 8, 2016

(54) LOCATION LOGGING AND LOCATION AND TIME BASED FILTERING

(75) Inventors: Donald William Gillies, San Diego, CA (US); Charles N. Lo, San Diego, CA (US); Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 12/636,037

(22) Filed: Dec. 11, 2009

(65) Prior Publication Data

US 2010/0151882 A1    Jun. 17, 2010

Related U.S. Application Data

(60) Provisional application No. 61/122,681, filed on Dec. 15, 2008.

(51) Int. Cl.
 *H04W 24/00* (2009.01)
 *G06Q 30/02* (2012.01)
 (Continued)

(52) U.S. Cl.
 CPC ............ *G06Q 30/02* (2013.01); *H04L 12/1859* (2013.01); *H04L 67/18* (2013.01); *H04L 67/325* (2013.01); *H04W 4/028* (2013.01); *H04L 12/1895* (2013.01); *H04W 4/001* (2013.01);
 (Continued)

(58) Field of Classification Search
 CPC ....... H04W 4/021; H04W 4/02; H04W 4/025; H04W 4/023; H04W 4/028
 USPC ...................................... 455/456.1
 See application file for complete search history.

(56) References Cited

U.S. PATENT DOCUMENTS

| | | | |
|---|---|---|---|
| 5,432,542 A | 7/1995 | Thibadeau et al. | |
| 5,636,245 A | 6/1997 | Ernst et al. | |

(Continued)

FOREIGN PATENT DOCUMENTS

| | | |
|---|---|---|
| CN | 102195994 A | 9/2011 |
| EP | 1085685 A2 | 3/2001 |

(Continued)

OTHER PUBLICATIONS

Advanced Television Systems Committee, "ATSC Candidate Standard: Non-Real-Time Content Delivery," Doc. TSG-876r1, Dec. 2, 2010, pp. 1-118.

(Continued)

*Primary Examiner* — Khalid Shaheed
(74) *Attorney, Agent, or Firm* — Linda Gunderson; Thomas A. Jolly

(57) ABSTRACT

Techniques for performing location logging and location and time based filtering are described. In one design of location logging, a terminal periodically determines its location, e.g., during its paging slots. The terminal determines whether there is a change in its location and stores its location if a change in location is detected. In one design of location and time based filtering, the terminal obtains a location and time criterion with a target area and a time period. The terminal determines its location during the time period, e.g., based on the location log. The terminal evaluates the location and time criterion based on the target area and its location during the time period, e.g., based on at least one sector ID for the target area and one or more sector IDs for its location. The terminal determines whether to download and/or present broadcast information based on the result of the evaluation.

49 Claims, 8 Drawing Sheets

In each paging slot,
 1. wake up from sleep,
 2. listen for pages,
 3. make pilot measurements,
 4. determine if another sector is more suitable,
 5. go back to sleep if no change in serving sector, and
 6. register for pages in new serving sector if there is a change.

In each logging interval,
 1. determine if there is a change in serving sector, and
 2. log sector ID of new serving sector if there is a change.

(51) Int. Cl.
*H04L 12/18* (2006.01)
*H04L 29/08* (2006.01)
*H04W 4/00* (2009.01)
*H04W 4/02* (2009.01)
*H04W 4/06* (2009.01)

(52) U.S. Cl.
CPC ............... *H04W 4/02* (2013.01); *H04W 4/021* (2013.01); *H04W 4/027* (2013.01); *H04W 4/06* (2013.01)

(56) References Cited

U.S. PATENT DOCUMENTS

| | | |
|---|---|---|
| 5,740,369 A | 4/1998 | Yokozawa et al. |
| 5,948,043 A | 9/1999 | Mathis |
| 6,032,053 A | 2/2000 | Schroeder et al. |
| 6,216,385 B1 | 4/2001 | Abe |
| 6,522,250 B1 | 2/2003 | Ernst et al. |
| 6,539,232 B2 | 3/2003 | Hendrey et al. |
| 6,587,835 B1 | 7/2003 | Treyz et al. |
| 6,801,779 B1 | 10/2004 | Liebenow |
| 6,867,688 B2 | 3/2005 | Lamb |
| 6,975,346 B2 | 12/2005 | Kumhyr |
| 7,085,818 B2 | 8/2006 | Brown et al. |
| 7,271,765 B2 * | 9/2007 | Stilp et al. ............... 342/457 |
| 7,565,153 B2 | 7/2009 | Alcock et al. |
| 7,672,678 B2 | 3/2010 | Gaw |
| 7,706,740 B2 | 4/2010 | Collins et al. |
| 7,895,121 B2 | 2/2011 | Lukose et al. |
| 8,311,048 B2 | 11/2012 | Mataga et al. |
| 2001/0022558 A1* | 9/2001 | Karr et al. ............... 342/450 |
| 2001/0045886 A1 | 11/2001 | Minowa |
| 2002/0087401 A1 | 7/2002 | Leapman et al. |
| 2003/0002536 A1 | 1/2003 | Wong et al. |
| 2003/0005451 A1 | 1/2003 | Connelly |
| 2003/0040272 A1 | 2/2003 | Lelievre et al. |
| 2003/0098929 A1 | 5/2003 | Nono |
| 2003/0129994 A1 | 7/2003 | Nagatsuma et al. |
| 2003/0169185 A1 | 9/2003 | Taylor |
| 2003/0222909 A1 | 12/2003 | Long et al. |
| 2005/0096065 A1 | 5/2005 | Fleischman |
| 2005/0120050 A1 | 6/2005 | Myka et al. |
| 2005/0177846 A1 | 8/2005 | Maruyama et al. |
| 2005/0281029 A1 | 12/2005 | Inamoto |
| 2006/0080029 A1 | 4/2006 | Kodani et al. |
| 2006/0121912 A1 | 6/2006 | Borjesson |
| 2006/0133338 A1 | 6/2006 | Reznik et al. |
| 2006/0156209 A1 | 7/2006 | Matsuura et al. |
| 2006/0168027 A1 | 7/2006 | Doan et al. |
| 2006/0218586 A1 | 9/2006 | Pohjolainen et al. |
| 2006/0229058 A1 | 10/2006 | Rosenberg |
| 2006/0248090 A1 | 11/2006 | Bennett et al. |
| 2006/0253453 A1 | 11/2006 | Chmaytelli et al. |
| 2007/0026871 A1 | 2/2007 | Wager |
| 2007/0054634 A1 | 3/2007 | Seppala |
| 2007/0087756 A1 | 4/2007 | Hoffberg |
| 2007/0101391 A1 | 5/2007 | Hwang |
| 2007/0124395 A1 | 5/2007 | Edge et al. |
| 2007/0168655 A1 | 7/2007 | Thomasson et al. |
| 2007/0202886 A1 | 8/2007 | Dhebri et al. |
| 2007/0259624 A1* | 11/2007 | Alizadeh-Shabdiz et al. ............... 455/67.11 |
| 2007/0283268 A1 | 12/2007 | Berger et al. |
| 2008/0060000 A1 | 3/2008 | Drouet et al. |
| 2008/0134264 A1 | 6/2008 | Narendra et al. |
| 2008/0201746 A1 | 8/2008 | Xu et al. |
| 2008/0248813 A1 | 10/2008 | Chatterjee |
| 2008/0256139 A1 | 10/2008 | Jessee |
| 2009/0005067 A1 | 1/2009 | Ernst et al. |
| 2009/0019509 A1 | 1/2009 | Horn et al. |
| 2009/0089535 A1 | 4/2009 | Lohmar et al. |
| 2009/0093259 A1 | 4/2009 | Edge et al. |
| 2009/0177942 A1 | 7/2009 | Hannuksela et al. |
| 2009/0178081 A1 | 7/2009 | Goldenberg et al. |
| 2009/0207839 A1 | 8/2009 | Cedervall et al. |
| 2009/0210510 A1 | 8/2009 | Bouazizi |
| 2009/0252070 A1 | 10/2009 | Connors et al. |
| 2009/0288116 A1 | 11/2009 | Zalewski |
| 2009/0307564 A1 | 12/2009 | Vedantham et al. |
| 2010/0050032 A1 | 2/2010 | Bichot et al. |
| 2010/0146077 A1 | 6/2010 | Davies et al. |
| 2010/0162334 A1 | 6/2010 | Suh et al. |
| 2010/0162339 A1 | 6/2010 | Suh et al. |
| 2010/0180007 A1 | 7/2010 | Suh et al. |
| 2010/0299702 A1 | 11/2010 | Lo et al. |
| 2011/0064082 A1 | 3/2011 | Zalewski |
| 2011/0075612 A1 | 3/2011 | Guo et al. |
| 2011/0258049 A1 | 10/2011 | Ramer et al. |
| 2011/0289542 A1 | 11/2011 | Kitazato et al. |
| 2012/0239785 A1 | 9/2012 | Pazos |
| 2012/0303745 A1 | 11/2012 | Lo et al. |
| 2013/0097641 A1 | 4/2013 | Suh et al. |
| 2013/0281007 A1 | 10/2013 | Edge |

FOREIGN PATENT DOCUMENTS

| | | |
|---|---|---|
| EP | 1209886 A2 | 5/2002 |
| EP | 1903757 A1 | 3/2008 |
| GB | 2363289 | 12/2001 |
| GB | 2404115 | 1/2005 |
| GB | 2406468 | 3/2005 |
| JP | S63310234 A | 12/1988 |
| JP | 1198549 A | 8/1989 |
| JP | 3131131 A | 6/1991 |
| JP | H0621905 A | 1/1994 |
| JP | 7220196 A | 8/1995 |
| JP | H088859 A | 1/1996 |
| JP | H08181702 A | 7/1996 |
| JP | H09212484 A | 8/1997 |
| JP | 10504392 T | 4/1998 |
| JP | 11041639 A | 2/1999 |
| JP | 2000252930 | 9/2000 |
| JP | 2000261462 A | 9/2000 |
| JP | 2001197021 A | 7/2001 |
| JP | 2002026836 A | 1/2002 |
| JP | 2002044012 | 2/2002 |
| JP | 2002135826 A | 5/2002 |
| JP | 2002186033 A | 6/2002 |
| JP | 2002232933 A | 8/2002 |
| JP | 2002237760 A | 8/2002 |
| JP | 2002531997 A | 9/2002 |
| JP | 2002290564 A | 10/2002 |
| JP | 2002325069 A | 11/2002 |
| JP | 2002334029 A | 11/2002 |
| JP | 2003018108 A | 1/2003 |
| JP | 2003030194 A | 1/2003 |
| JP | 2003143642 A | 5/2003 |
| JP | 2003153334 A | 5/2003 |
| JP | 2004112135 A | 4/2004 |
| JP | 2004128543 A | 4/2004 |
| JP | 2004236125 A | 8/2004 |
| JP | 2004297394 A | 10/2004 |
| JP | 2004533779 A | 11/2004 |
| JP | 2005051781 A | 2/2005 |
| JP | 2005165454 A | 6/2005 |
| JP | 2005308410 A | 11/2005 |
| JP | 2006033008 A | 2/2006 |
| JP | 2006080843 A | 3/2006 |
| JP | 2007129731 A | 5/2007 |
| JP | 2007135105 A | 5/2007 |
| JP | 2007295610 A | 11/2007 |
| JP | 2007300168 A | 11/2007 |
| JP | 2008538250 A | 10/2008 |
| JP | 2009539304 A | 11/2009 |
| JP | 2010502143 A | 1/2010 |
| KR | 20050049418 A | 5/2005 |
| RU | 2004121994 A | 1/2006 |
| RU | 2273956 C2 | 4/2006 |
| WO | WO9605678 A1 | 2/1996 |
| WO | WO0022860 A1 | 4/2000 |
| WO | WO-0033493 A1 | 6/2000 |
| WO | WO0174034 A2 | 10/2001 |
| WO | WO0186505 A2 | 11/2001 |

(56) References Cited

FOREIGN PATENT DOCUMENTS

| WO | WO0186508 A2 | 11/2001 |
| --- | --- | --- |
| WO | WO0219741 A2 | 3/2002 |
| WO | WO-02099983 A1 | 12/2002 |
| WO | 03043210 A1 | 5/2003 |
| WO | 03055142 | 7/2003 |
| WO | WO2004077291 A1 | 9/2004 |
| WO | WO2005086521 A1 | 9/2005 |
| WO | 2005125238 A1 | 12/2005 |
| WO | WO2006100571 A1 | 9/2006 |
| WO | 2006105434 A2 | 10/2006 |
| WO | WO2007038355 | 4/2007 |
| WO | 2007049840 A1 | 5/2007 |
| WO | 2007078252 A2 | 7/2007 |
| WO | 2007130150 | 11/2007 |
| WO | WO-2008025578 A1 | 3/2008 |
| WO | WO 2009046362 A1 * | 4/2009 |

OTHER PUBLICATIONS

Camarillo, et al., "The Session Description Protocol (SDP) Grouping Framework," Internet Engineering Task Force (IETF), Request for Comments: 5888, Obsoletes: 3388, Category: Standards Track, ISSN: 2070-1721, Jun. 2010.

Hui, et al., "A General Architecture in Support of Personalized, Interactive Multimedia Services in the Mobile Broadcast Convergent Environment," Testbeds and Research Infrastructure for the Development of Networks and Communities, 2007. TridentCom 2007, pp. 1-6.

International Search Report and Written Opinion—PCT/US2009/067902—International Search Authority European Patent Office—Jun. 10, 2010.

Paila T., et al: "FLUTE—File Delivery over Unidirectional Transport; draft-ietf-rmt-flute-revised-11.txt", Internet Engineering Task Force, IETF; Standardworkingdraft, Internet Society (ISOC) 4, Rue Des Falaises CH—1205 Geneva, Switzerland, No. 11, Mar. 26, 2010, pp. 1-42, XP015067217.

Faria G., et al., "DVB-H: Digital Broadcast Services to Handheld Devices", Proceedings of the IEEE, vol. 94, No. 1, Jan. 2006.

Frojdh P., et al., "Study on 14496-12:2005/PDAM2 ALU/ FLUTE Server File Format", 78.MPEG Meeting; Oct. 23, 2010-Oct. 27, 2010; Hangzhou: (Motion Picturexpert Group or ISO/ IEC JTC1/SC29/WG11) No. M13855, Oct. 13, 2006, XP030042523, ISSN: 0000-0233.

Taiwan Search Report—TW098142988—TIPO—Jan. 11, 2013.

European Search Report—EP12008210—Search Authority—Munich—Mar. 12, 2013.

European Patent Office Application Serial No. 09015446.9, Search Report dated Jun. 5, 2013, 7 pages.

Nobena Y., "Rise of the idea <Opt-in Schedule>," Mobile greatly changes business style! [With graphics], All about "m-commerce," PHP Inc. Oct. 16, 2000, 1st edition, pp. 154-157.

Joshi et al., "Simplified transforms for extended block sizes", ITU-T SG16 Q6 (VCEG), Document VCEG-AL30, 38th VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.

Open Mobile Alliance, Service Guide for Mobile Broadcast Services, OMA-TS-BCAST Service Guide, Approved Version 1.1—Oct. 29, 2013, pp. 1-299.

Taiwan Search Report—TW102112538—TIPO—Oct. 22, 2014.

* cited by examiner

LOCATION LOGGING AND LOCATION AND TIME BASED FILTERING

CLAIM OF PRIORITY UNDER 35 U.S.C. §119

The present Application for Patent claims priority to Provisional U.S. Application Ser. No. 61/122,681, entitled "Location and Time Based Filtering," filed Dec. 15, 2008, assigned to the assignee hereof, and expressly incorporated herein by reference.

BACKGROUND

I. Field

The present disclosure relates generally to communication, and more specifically to techniques for receiving broadcast information.

II. Background

A communication network may broadcast various types of information such as commercial advertisements, news, weather and travel advisories, segments of film, educational items, television shows, sporting events, public warning messages, etc. Broadcast information may thus include any type of information sent to more than one user and may also be referred to as broadcast content. A given user may be interested in receiving only some of the broadcast information sent by the network. The user may manually identify broadcast information of interest to the user and may either save or display the broadcast information on a receiver, e.g., a cellular phone. This manual filtering of broadcast information may be tedious. It may be desirable to automatically identify broadcast information of potential interest to the user.

SUMMARY

Techniques for performing location logging and location and time based filtering to receive broadcast information are described herein. In an aspect, a terminal may periodically record its location and maintain a location log to support location and time based filtering. In one design, the terminal may periodically determine its location, e.g., during its paging slots while operating in an idle mode. The terminal may determine whether there is a change in its location and may store its location and a timestamp if a change in location is detected. In one design, the terminal may periodically determine its serving sector and ascertain whether there is a change in serving sector. The terminal may store a sector identity (ID) of the serving sector and a timestamp if a change in serving sector is detected.

In another aspect, the terminal may perform location and time based filtering to receive broadcast information. The terminal may maintain a log of its location. The terminal may obtain a location and time criterion, e.g., from a broadcast transmission, or a unicast transmission, or pre-provisioning in non-volatile memory on the terminal. The location and time criterion may comprise a target area and a time period in which the location and time criterion applies. The terminal may determine its location during the time period, e.g., based on the log of its location. The terminal may evaluate the location and time criterion based on the target area and its location during the time period. In one design, the terminal may determine at least one sector ID or polygon for the target area and one or more sector IDs or polygons for its location during the time period. The terminal may then evaluate the location and time criterion based on the at least one sector ID or polygon for the target area and the one or more sector IDs or polygons for its location. The terminal may determine whether to download and/or present broadcast information based on the result of the evaluation.

Various aspects and features of the disclosure are described in further detail below.

DETAILED DESCRIPTION

The techniques described herein may be used to receive information from various wireless and wireline communication networks. The terms "network" and "system" are often used interchangeably. For example, the techniques may be used to receive information from cellular networks, broadcast networks, etc. The techniques may be used to receive broadcast information sent to all users, multicast information sent to a specific group of users, and unicast information sent to a specific user. For clarity, certain aspects of the techniques are described below for receiving broadcast information from a communication network.

Figure 1:
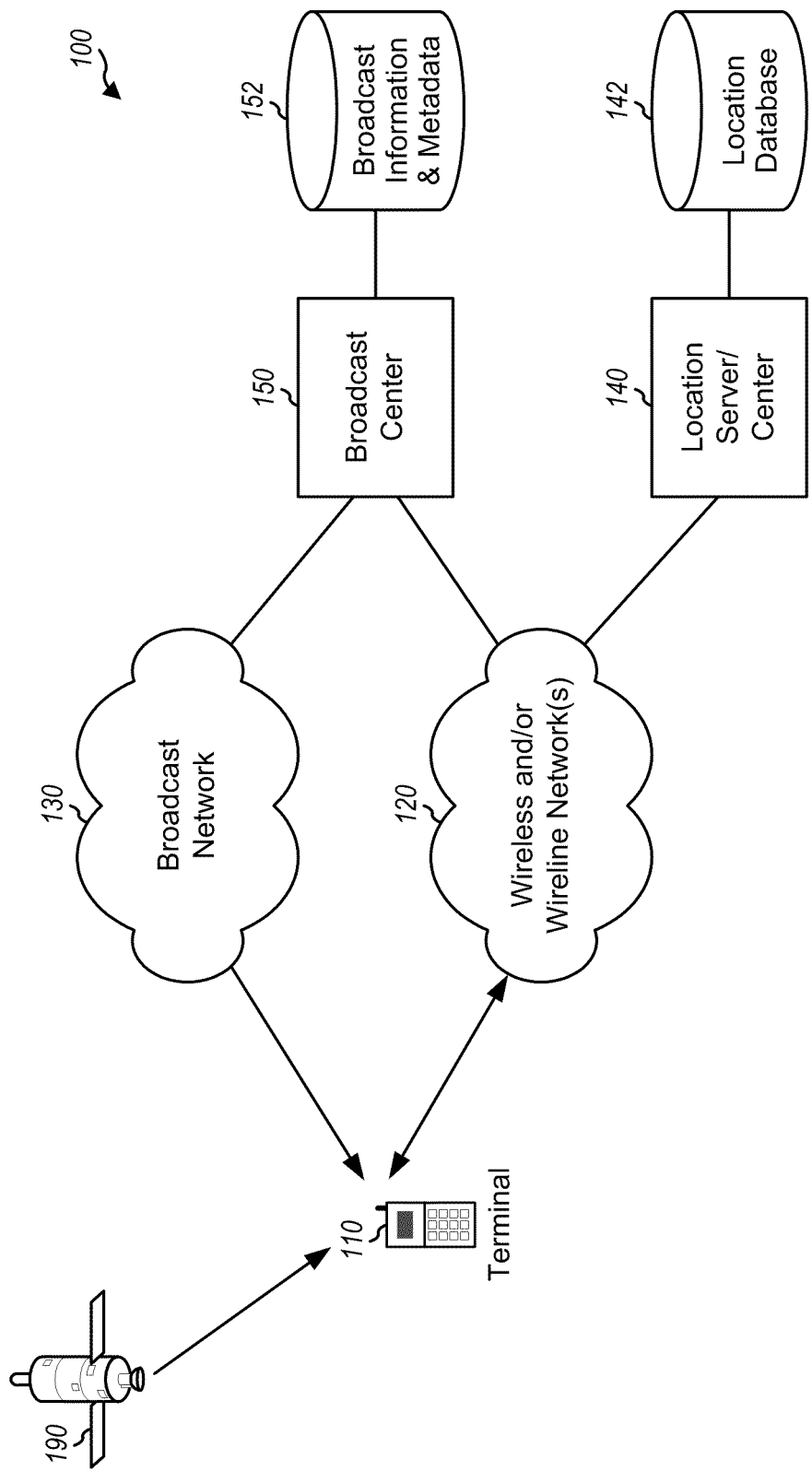
FIG. 1 shows an exemplary network deployment.

FIG. 1 shows an exemplary network deployment 100 supporting the techniques described herein. A terminal 110 may communicate with one or more wireless and/or wireline networks 120 to obtain communication services and/or data connectivity. Terminal 110 may communicate with one or more base stations in a wireless network and/or one or more servers in a wireline network. Terminal 110 may also receive broadcast information from a broadcast network 130. Terminal 110 may be stationary or mobile and may also be referred to as a mobile station, a user equipment, an access terminal, a subscriber unit, a station, etc. Terminal 110 may be a cellular phone, a personal digital assistant (PDA), a wireless device, a wireline device, a wireless modem, a laptop computer, a personal computer (PC), a broadcast receiver, etc. The functions of terminal 110 may also be spread over more than one device. For example, transmission and reception may be supported in a cellular phone or a PDA while an associated laptop or PC may perform filtering of broadcast information and presentation of filtered broadcast information to a user. In addition, terminal 110 may receive and transmit signals via a mobile satellite system, which may be a Globalstar system, an Iridium system, an OmniTracs system, etc. Terminal 110 may also receive signals via a fixed satellite broadcast system such as a DirecTV system, an EchoStar system, or a receive-transmit ICO Global system.

Terminal 110 may also receive and measure signals from satellites 190 to obtain pseudo-ranges for the satellites. Satellites 190 may be part of the United States Global Positioning System (GPS), the European Galileo system, the Russian GLONASS system, the Japanese Quasi-Zenith Satellite System (QZSS), the Chinese Compass/Beidou system, the Indian Regional Navigational Satellite System (IRNSS), some other global navigation satellite system (GNSS), or a combination of these systems. The pseudo-ranges and the known locations of the satellites may be used to derive a location estimate for terminal 110. Terminal 110 may also receive and measure signals from base stations in a wireless network to obtain timing and/or signal strength measurements. The timing and/or signal strength measurements and the known locations and/or coverage areas of the base stations may be used to derive a location estimate for terminal 110. In general, a location estimate may be derived based on measurements for satellites, base stations, pseudo satellites, and/or other transmitters and using one or a combination of positioning methods.

Network(s) 120 may include a wireless network that supports radio communication for terminals located within its coverage area. A wireless network may be a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A CDMA network may implement Wideband CDMA (WCDMA), CDMA 1x, High Rate Packet Data (HRPD), or some other CDMA radio technology. A TDMA network may implement Global System for Mobile Communications (GSM) or some other TDMA radio technology. An OFDMA network may implement Long Term Evolution (LTE), LTE-Advanced (LTE-A), Ultra Mobile Broadband (UMB), IEEE 802.11, IEEE 802.16, or some other OFDMA radio technology. WCDMA, LTE, LTE-A and GSM are described in documents from an organization named "3rd Generation Partnership Project" (3GPP). CDMA 1x, HRPD, and UMB are described in documents from an organization named "3rd Generation Partnership Project 2" (3GPP2).

A wireless network may include a number of base stations. In 3GPP, the term "cell" can refer to the smallest coverage area of a base station and/or a base station subsystem serving this coverage area. In 3GPP2, the term "sector" or "cell-sector" can refer to the smallest coverage area of a base station and/or a base station subsystem serving this coverage area. For clarity, 3GPP2 concept of sector is used in much of the description below. A base station may support one or multiple (e.g., three) sectors.

Alternatively or additionally, network(s) 120 may include a wireline network such as a local area network (LAN), a digital subscriber line (DSL) network, a packet cable network, an Internet Service Provider (ISP) network, a telephone network, the Internet, etc.

Broadcast network 130 may provide broadcast services and may implement MediaFLO™, Digital Video Broadcasting for Handhelds (DVB-H), Integrated Services Digital Broadcasting for Terrestrial Television Broadcasting (ISDB-T), or some other digital transmission technology. Broadcast network 130 may also assist terminal 110 in determining its location. For example, terminal 110 may measure signal timing information from one or more broadcast transmitters and may determine its location via triangulation, trilateration, or some other means.

A location server/center 140 may comprise a location server that supports positioning for terminal 110 and other location services (LCS) clients. Positioning refers to a process to determine a geographic or civil location estimate for an LCS target, e.g., obtain latitude, longitude and altitude coordinates for geographic location or a street address for civil location. The location server may perform various functions to support positioning, e.g., calculate location estimates, deliver assistance data to terminals, perform functions for security, etc. The location server may support one or more location architectures/solutions such as Secure User Plane Location (SUPL) from Open Mobile Alliance (OMA), 3GPP control plane, 3GPP2 control plane, etc. The location server may comprise a SUPL Positioning Center (SPC), a 3GPP Serving Mobile Location Center (SMLC), a 3GPP2 Position Determining Entity (PDE), a Skyhook (802.11) Location Server, etc.

Location server/center 140 may also comprise a location center that supports location services for terminal 110 and other LCS clients. The location center may perform various functions such as support of location services, support of subscriber privacy, authorization, authentication, charging/billing, service management, etc. The location center may comprise a SUPL Location Center (SLC), a SUPL Location Platform (SLP), a 3GPP Gateway Mobile Location Center (GMLC), a 3GPP2 Mobile Position Center (MPC), etc. The location server and location center may be integrated (as shown in FIG. 1) or may be separate entities. A location database 142 may store location information that may be used to support positioning and/or location-based services.

A broadcast center 150 may provide broadcast information for broadcast services. The broadcast information may comprise any information that may be of interest to users, e.g., entertainment television (TV), radio, advertisements, news, etc. Broadcast center 150 or some other entity may also provide broadcast metadata for the broadcast information, as described below. A storage unit 152 may store the broadcast information and broadcast metadata. Broadcast center 150 may provide the broadcast information and broadcast metadata to network(s) 120 and/or broadcast network 130. The broadcast information and broadcast metadata may be transmitted together or separately by network(s) 120 and/or broadcast network 130.

The broadcast metadata may enable a terminal (e.g., terminal 110) to perform location and time based filtering of the broadcast information, typically in conjunction with stored user preferences and/or profile. The broadcast metadata may enable the terminal to make a decision regarding whether to receive the broadcast information and present this information to the user. The user preferences/profile may be entered previously by the user into the terminal or may be ascertained in other manners, e.g., by observing user preferences for manually selecting previous broadcast information and the criteria that apply to the selected broadcast information in building a set of user behavior related heuristics. The location and time based filtering by the terminal may reduce the burden on the user of having to scan through and select particular broadcasts from possibly a large number of broadcasts. Based on the outcome of the filtering, the terminal may alert the user to the presence of the broadcast information before, during, or after it has been received. The terminal may also store and/or present the broadcast information if it is of potential interest to the user or may silently ignore (e.g., not receive and store) the broadcast information. The manner of alerting the user to broadcast information that passes the filtering may also depend on the filtering. For example, an audible alarm may be provided for broadcasts of an emergency nature whereas commercial broadcasts may be (i) saved and provided to the user following an explicit request or (ii) inserted automatically for display along with the main program.

The user may define items of interest to the user and methods of being informed when such items of interest are detected. The terminal may filter broadcast information by examining the associated broadcast metadata in light of the user preferences. If there is a match, then the terminal may alert the user, as specified, and may also store and/or present the broadcast information to the user.

In one design, the broadcast metadata may include location and time criteria. The terms "criteria" and "requirements" are used interchangeably herein. A location and time criterion may be related to the location and time of an event associated with the broadcast information, e.g., a sales event, a sporting event, etc. An event may be in the past, present, or future. A location and time criterion may comprise a location criterion and an associated time criterion. A location criterion may be given by a target area in which a potential recipient terminal should be within (or outside of) in order for the broadcast information to be pertinent. A time criterion may be given by a time period in which the terminal should be within (or outside of) the target area. This time period may be in the past, present, or future. If the terminal is within (or outside of) the target area during the specified time period (i.e., if the location and time criterion is met), then the terminal may give higher priority to receiving the associated broadcast information and providing this information to the user. Alternately, the terminal may refuse to provide (e.g., black-out) the associated broadcast information to the user if the location and time criterion is met.

In one design, location and time criteria for broadcast information may specify the presence or absence of a terminal for each of a set of target areas, as follows:

$$\text{Location time criteria} = (PA_1 \text{ at } L_1 \text{ during } D_1) LO_1 (PA_2 \text{ at } L_2 \text{ during } D_2) LO_2 (PA_3 \text{ at } L_3 \text{ during } D_3) \ldots LO_{N-1} (PA_N \text{ at } L_N \text{ during } D_N), \quad \text{Eq (1)}$$

where $L_n$ denotes a target area for the n-th location and time criterion, for $1 \leq n \leq N$, $D_n$ denotes a time period or time instant for the n-th location and time criterion, $PA_n$ denotes a presence or absence requirement for the n-th location and time criterion, and $LO_n$ denotes a logical operation, which may be a logical OR or a logical AND.

In the design shown in equation (1), the location and time criteria are defined by a set of N target areas $L_1$ through $L_N$, where in general $N \geq 1$. Each target area may be defined as described below. N time periods $D_1$ through $D_N$ may be provided for the N target areas $L_1$ through $L_N$, respectively. Each time period $D_n$ may be defined by a start time $TS_n$ and an end time $TE_n$. $TS_n$ and $TE_n$ may each be defined in the past, present, or future, with $TE_n$ occurring at or after $TS_n$.

In one design, the presence or absence requirement $PA_n$ for each location criterion may have one of the following values:

1. Present for some of the time period with a probability of at least $P_n$,
2. Present for the entire time period with a probability of at least $P_n$,
3. Absent for some of the time period with a probability of at least $P_n$, or
4. Absent for the entire time period with a probability of at least $P_n$.

Probability $P_n$ may be any value between 0 and 1, or $0 \leq P_n \leq 1$.

The location and time criteria in equation (1) combine N individual location and time criteria to obtain an overall requirement for a terminal Each location and time criterion may be expressed as:

$$LR_n = PA_n \text{ at } L_n \text{ during } D_n, \quad \text{Eq (2)}$$

where $LR_n$ denotes the n-th location and time criterion.

In another design, the location and time criteria may be specified as follows:

$$\text{Location time criteria} = LTC_A LO_A LTC_B LO_B LTC_C \ldots, \quad \text{Eq (3)}$$

where $LTC_i$ denotes a location and time criterion, for $i \in A, B, C, \ldots$, and $LO_i$ denotes a logical operation, which may be a logical AND or a logical OR.

$LTC_i$ may be defined as shown in equation (1). The design in equation (3) allows multiple location time criteria to be combined logically to form more complex location and time criteria. The multiple location time criteria may be combined in an arbitrary expression tree, using parenthesis to indicate an order of evaluation for each expression.

In yet another design, the location and time criteria may be specified in a recursive manner as follows:

$$\text{Location time criteria} = \text{Expression}(i) \{\text{binary operation Expression}(j)\}, \quad \text{Eq (4)}$$

where $\{ \ldots \}$ denotes an optional extension, which may or may not be present, Expression( ) denotes {Expression( ) binary operation Expression( )}, or {Unary operation Expression( )}, or (single location and time criterion), binary operation denotes logical OR, logical AND, or some other operation on two arguments, and unary operation denotes logical NOT or some other operation on one argument.

The single location and time criterion may be given as shown in equation (2).

To evaluate equation (4), the truth value of each single location and time criterion may first be determined as either true or false, as described for equation (1). The truth values for all single location and time criteria may be combined using the unary and/or binary operations linking them to yield a final true or false value for the overall requirement in equation (4). A true value for the overall requirement may indicate that the location and time criteria for the broadcast information are satisfied. A false value may indicate that the location and time criteria are not satisfied.

Location and time criteria for broadcast information may also be defined in other manners. Location and time criteria are described in further detail in commonly assigned U.S. patent application Ser. No. 12/244,654, entitled "LOCATION AND TIME BASED FILTERING OF BROADCAST INFORMATION," filed Oct. 2, 2008, incorporated by reference herein.

Location and time based filtering of broadcast information may be illustrated by the following example. In this example, a department store in a shopping mall is holding a large sale on an upcoming Saturday and would like to advertise this sale to people who live nearby, to people who are likely to be present during the sale due to having visited the mall on recent previous Saturdays, and to people who are expected to be in the vicinity of the store during sale hours. To target these users in an advertisement for the sale, the location and time criteria for the broadcast advertisement may be given as follows:

$$\text{Location time criteria} = LTC_A \text{ OR } LTC_B \text{ OR } LTC_C. \quad \text{Eq (5)}$$

In equation (5), $LTC_A$ may define a location and time criterion that a terminal (and hence a user) has been present at the mall on at least one of three previous Saturdays with a probability of at least 50%. This means that the user probably visits the mall at least occasionally on Saturdays and may be interested in the sales event. $LTC_B$ may define a location and time criterion that a terminal has been present in the area surrounding the mall on each of three previous nights with a probability of at least 70%. This makes it likely that the user lives near the mall and may have an interest in the sales event. $LTC_C$ may define a location and time criterion that a terminal will be in the city area containing the mall sometime during the sales event with a probability of at least 50%.

$LTC_A$ in equation (5) may be expressed as follows:

$$LTC_A = (PA_1 \text{ at } L_1 \text{ during } D_1) \text{ OR } (PA_2 \text{ at } L_2 \text{ during } D_2)$$
$$\text{OR } (PA_3 \text{ at } L_3 \text{ during } D_3)$$

where $PA_1$, $PA_2$, $PA_3$=present for some of the time period with a probability of 50%, $L_1$, $L_2$, $L_3$=area of the shopping mall, and $D_1$, $D_2$, $D_3$=each of three previous Saturdays, e.g., with 9:00 am start time and 6:00 pm end time.

$LTC_B$ in equation (5) may be expressed as follows:

$$LTC_B = (PA_1 \text{ at } L_1 \text{ during } D_1) \text{ AND } (PA_2 \text{ at } L_2 \text{ during } D_2) \text{ AND } (PA_3 \text{ at } L_3 \text{ during } D_3)$$

where $PA_1$, $PA_2$, $PA_3$=present for the entire time period with a probability of $\geq 70\%$, $L_1$, $L_2$, $L_3$=area of the city containing the shopping mall, and $D_1$, $D_2$, $D_3$=each of three consecutive previous days, e.g., $D_1$=Monday, $D_2$=Tuesday, $D_3$=Wednesday, with midnight start time and 6:00 am end time.

$LTC_C$ in equation (5) may be expressed as follows:

$$LTC_C = (PA_1 \text{ at } L_1 \text{ during } D_1)$$

where $PA_1$=present for some of the time period with a probability of at least 50%, $L_1$=area of the city containing the shopping mall, and $D_1$=the Saturday of the sale event, e.g., 9:00 am start time and 6:00 pm end time.

The parameters for the $LTC_A$, $LTC_B$, and $LTC_C$ expressions may be sent in the broadcast metadata for the sale advertisement to target potentially interested users. Additional information such as the type of items on sale, the level of price discounts, the credit interest rate, the name of the store, etc., may also be included in the broadcast metadata. The additional information may enable terminals to filter based on other user preferences such that the users may be alerted only if both the location and time criteria as well as other user preferences are satisfied.

Other examples of filtering broadcast information based on location and time criteria are described in the aforementioned U.S. patent application Ser. No. 12/244,654.

In an aspect, terminal 110 may periodically record its location and maintain a location log in order to support location and time based filtering of broadcast information and/or other applications. The location log may also be referred to as a location history database, etc. Terminal 110 may perform location logging such that its battery power is conserved as much as possible.

Figure 2:
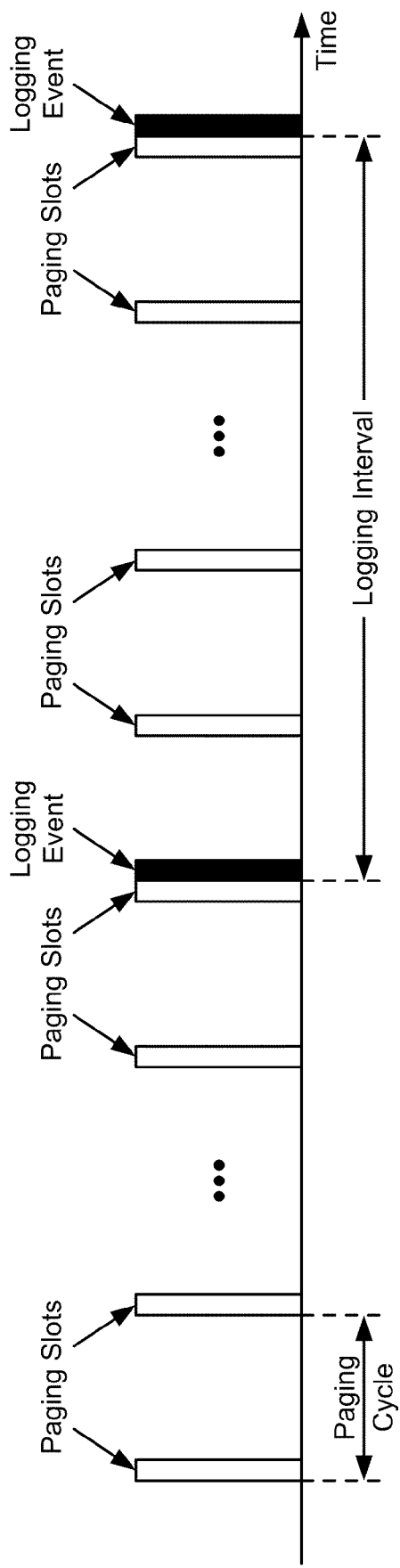
FIG. 2 shows a design of location logging.

FIG. 2 shows a design of location logging. Terminal 110 may operate in an idle mode when communication is not required and may camp on a serving sector. Terminal 110 may be configured with a paging cycle of T seconds and specific paging slots in which pages can be sent to terminal 110. The paging slots are spaced apart by T seconds, which may be configurable for terminal 110 and may be set to about 5 seconds or some other value. While in the idle mode, terminal 110 may wake up every T seconds prior to its paging slot, listen for pages, and make pilot strength measurements for the serving sector and neighbor sectors. Terminal 110 may determine whether another sector is more suitable to serve terminal 110 based on the pilot strength measurements and further in accordance with a set of rules specified by a wireless network, parameters provided by the serving sector, and/or other information. If there is no change in serving sector and no pages, then terminal 110 may go back to sleep. Otherwise, if there is a change in serving sector, then terminal 110 may register to receive pages from the new serving sector.

In one design, terminal 110 may log a sector ID whenever there is a change in serving sector. The sector ID of the new serving sector may be used to determine a coarse location estimate for terminal 110. This coarse location estimate may be given by the coverage area of the new serving sector. The sector ID may provide sufficient resolution of user location for location and time based filtering and other applications. The sector ID may be readily obtained by terminal 110 and may be available from normal processing in the idle mode to detect for better sectors. Hence, no additional processing may be required to obtain the sector ID. Furthermore, logging the sector ID only when there is a change in serving sector may reduce the number of entries to store in the log, which may reduce memory requirements. This technique for logging items only when there is a change is commonly known as run-length coding.

Terminal 110 may perform paging area registration (or location area update) whenever it moves into a new paging area. Some wireless networks may require terminal 110 to register only when leaving a large paging area, which may cover many sectors. Some other wireless networks may require registration only when terminal 110 has moved more than a threshold distance, i.e., whether the GPS distance between cell towers is greater than the threshold distance. For these wireless networks, instead of logging sector ID whenever paging area registration is performed, terminal 110 may log sector changes more frequently in order to obtain per-sector precision.

In one design, hysteresis and/or lowpass filtering may be used to avoid frequent logging of sector changes. For example, terminal 110 may toggle between two or more serving sectors due to fluctuations in channel conditions, which may be caused by shadowing and/or other phenomena. To avoid frequent logging, terminal 110 may retain a sector ID for a new serving sector for a particular time interval whenever a sector ID is logged. This time interval may be referred to as a logging interval. Terminal 110 may ignore changes in serving sector occurring within the logging interval. Terminal 110 may log a new sector ID if there is a change in serving sector after this logging interval. This scheme may avoid excessive logging by terminal 110 due to frequent changes in serving sectors. For example, if the logging interval is 15 minutes and a new sector ID can be logged after each logging interval, then at most 96 entries may be logged per day.

In one design, terminal 110 may log a sector ID whenever there is a change in serving sector (e.g., with hysteresis and/or lowpass filtering applied) as well as the time of the change, which may be referred to as a start time or a timestamp. In one design, each log entry may comprise up to seven bytes for sector ID and up to four bytes for the start time. These entry sizes suffice for present 3GPP and 3GPP2 networks, and seconds-level precision using Network Time Protocol (NTP) time. In general, any number of bytes may be used for sector ID and any number of bytes may be used for start time. The format of a sector ID entry in the location log and the number of bytes to use for the sector ID entry may be network dependent. For CDMA 1×, a sector ID entry may comprise a system identification (SID), a network identification (NID), and a base station identification (BaseID). For HRPD, a sector ID entry may comprise a SID, a NID, a packet zone ID (PZID), and a BaseID. For GSM, a sector ID entry may comprise a mobile country code (MCC), a mobile network code (MNC), a location area code (LAC), and a cell ID. For WCDMA, a sector ID entry may comprise an MCC, an MNC, a radio network controller ID (RNC-ID), and a cell ID. The amount of information to log may be reduced by omitting the redundant country and network portions of the sector ID when operating in the same wireless network.

Figure 3:
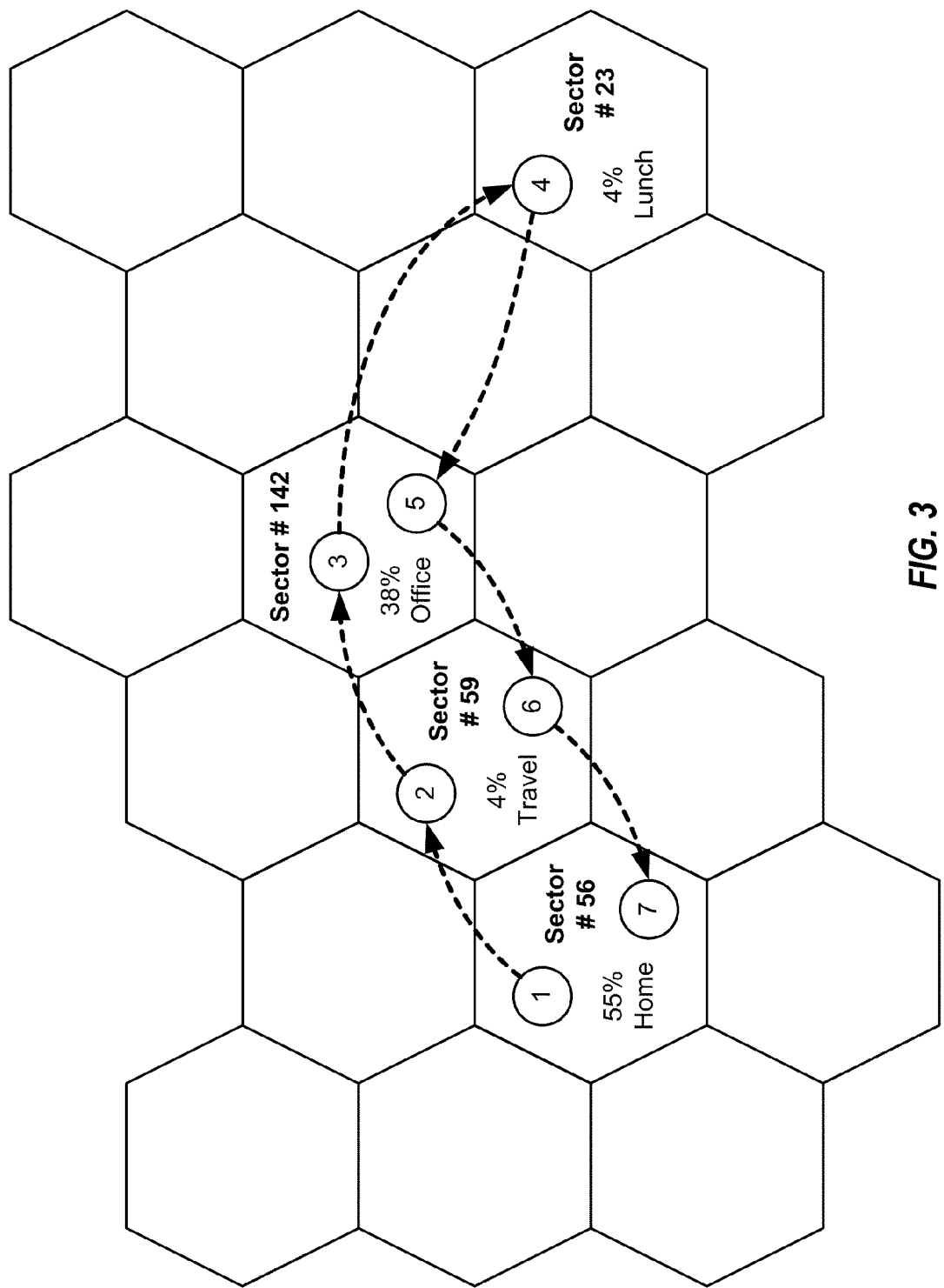
FIG. 3 shows an example of location logging by a terminal

FIG. 3 shows an example of location logging by terminal 110. Terminal 110 may be served by sector #56 at home overnight, by sector #59 during the morning commute to work, by sector #142 at work, by sector #23 during lunch, by sector #142 at work in the afternoon, by sector #59 during the evening commute, and by sector #56 at home after work. Table 1 shows an exemplary location log for terminal 110 for the example shown in FIG. 3.

TABLE 1

Location Log for One Day

| Entry | Location | Start Time | Description |
|---|---|---|---|
| 1 | Sector # 56 | 6:30 pm | At home overnight (dinner . . . breakfast) |
| 2 | Sector # 59 | 7:45 am | Commute to work |
| 3 | Sector # 142 | 8:00 am | At work in the office in the morning |
| 4 | Sector # 23 | 12:05 pm | Lunch |
| 5 | Sector # 142 | 1:05 pm | At work (office, meeting room) |
| 6 | Sector # 59 | 6:00 pm | Commute home |
| 7 | Sector # 56 | 6:30 pm | At home |

In the example shown in Table 1, the location log for terminal 110 may include (i) seven entries in 77 bytes for one day, (ii) 42 entries in 462 bytes for one week, or (iii) 630 entries in 6930 bytes for three months. A relatively small location log can thus store sector ID and start time for a relatively long period of time.

In one design, a location log for a given time period may be condensed using a histogram. The histogram may include a percentage of time in which terminal 110 is within a given area (e.g., a polygon) over the given time period. Table 2 shows an exemplary histogram for the location log given in Table 1. The histogram may indicate that terminal 110 is within the coverage of (i) sector #56 (at home) for 55% of the time, (ii) sector #142 (at work) for 38% of the time, (iii) sector #59 (during commuting) for 4% of the time, and (iv) sector #23 (during lunch) for 3% of the time.

TABLE 2

Histogram of Location Log

| Location | Time Percentage | Description |
|---|---|---|
| Sector # 56 | 55% | At home |
| Sector # 142 | 38% | At work |
| Sector # 59 | 4% | Commuting |
| Sector # 23 | 3% | Lunch |

In the example shown in FIG. 3, each sector is represented by a hexagon. In general, a sector may be represented by a polygon having any shape and size. A polygon may be a triangle, a quadrilateral, a pentagon, a hexagon, etc.

The location log in Table 1 and the histogram in Table 2 are two exemplary designs of storing a history of location for terminal 110. Past location of terminal 110 may also be stored using other formats and structures. In another design, terminal 110 may store multiple sector IDs for multiple sectors received with sufficient signal strength by terminal 110. Terminal 110 may also store the received signal strength of each sector and/or the probability of terminal 110 being within the sector. In yet another design, terminal 110 may periodically obtain a location estimate for itself based on a satellite-based positioning method and/or a network-based positioning method. Terminal 110 may store the location estimate in the location log. The location log may thus store the location of terminal 110 in any suitable format. The past location of terminal 110 may be used for location and time based filtering and/or other applications.

A target area for a location and time criterion may be defined in various manners. In one design, a target area may be defined based on one or more areas. Each area may have one of the following formats:
1. Shape—area is given by a polygon defined with GPS coordinates,
2. Country code—area is a country specified by a country code,
3. Name area—area is a city, region, or neighborhood with a given name,
4. Zip code—area corresponds to a zip code, and
5. Cell target area—area corresponds to coverage of a cell or sector.

Different types of cell target area may be supported by different wireless networks. For example, a terminal in a broadcast network (e.g., for DVB-H, MediaFLO™, etc.) may gather broadcast sector information for a large area (e.g., 50 mile diameter). A terminal in a WCDMA network may gather 3GPP cell IDs for cells covering approximately 2 kilometer (km) diameter. A terminal in a CDMA 1× network or an HRPD network may gather 3GPP2 sector IDs for sectors covering approximately 2 km diameter. A GPS-capable terminal may gather GPS coordinates, which may have accuracy of approximately 30 feet diameter. Some wireless networks may provide GPS coordinates of the cell/sector center.

In one design, a target area for a location and time criterion may be defined by one or more "shape" polygons. The target area may have any arbitrary shape and size and may be decomposed into polygons (e.g., triangles) based on any triangulation algorithm known in the art. An exemplary triangulation algorithm is described by J. R. Shewchuk in "Triangle: Engineering a 2D Quality Mesh Generator and Delaunay Triangulator," Appl. Comp. Geom.: Towards Geom. Engine, ser. Lecture Notes in Computer Science, 1148, pp. 203-222, May 1996, which is publicly available. The location of terminal 110 (or the user location) may also be defined by polygons. The location and time criterion may then be evaluated by comparing the polygons for the user location against the polygons for the target area. For example, once triangulation has been performed for a polygon for the target area, then each triangle of this polygon may be "clipped" against another polygon for the user location to derive an intersection polygon. This clipping may be based on a Sutherland-Hodgeman algorithm (where the target polygon is convex) or a Weiler-Atherton algorithm, which are known in the art.

Figure 4A:
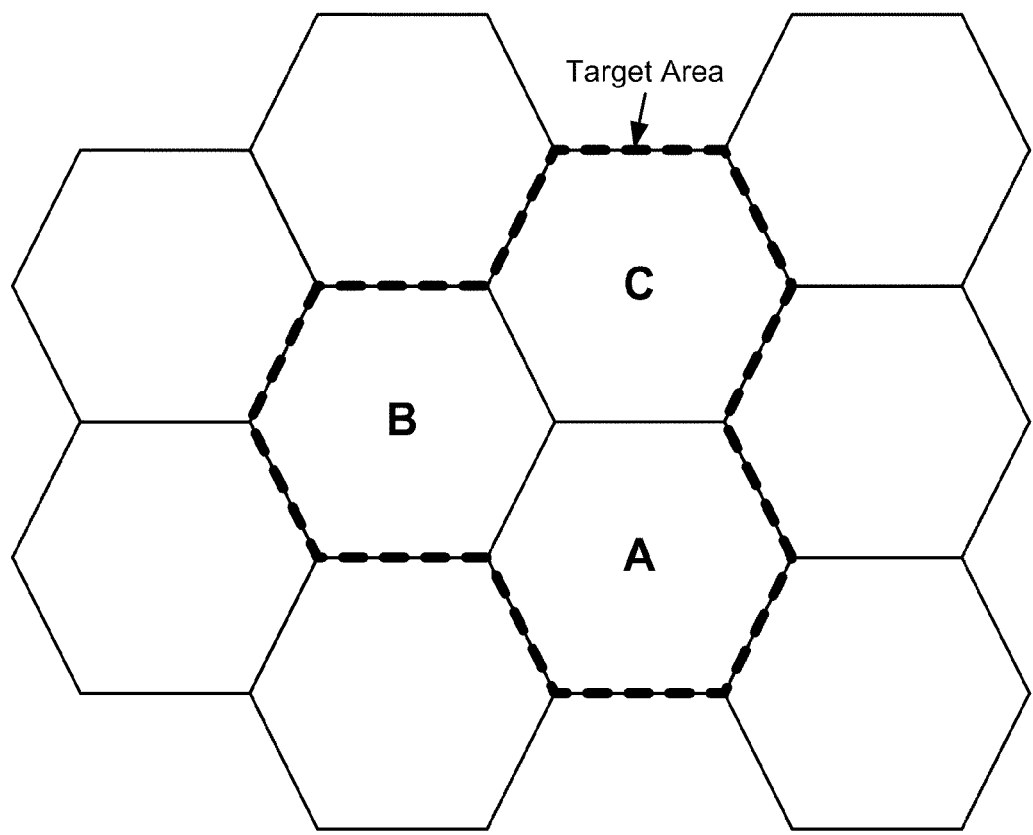
FIGS. 4A, 4B and 4C show evaluation of a location and time criterion.

FIG. 4A shows an exemplary target area defined by polygons. A shopping mall may be a target area for a location and time criterion and may be defined by three polygons A, B and C. These polygons may correspond to three sectors or cells. The location and time criterion may query whether a user is at the shopping mall with a probability of at least 50% for a specific time interval in the past two weeks. A determination may then be made whether the user is located within polygon A, B or C for the specific duration in the past two weeks with at least 50% probability.

Figure 4B:
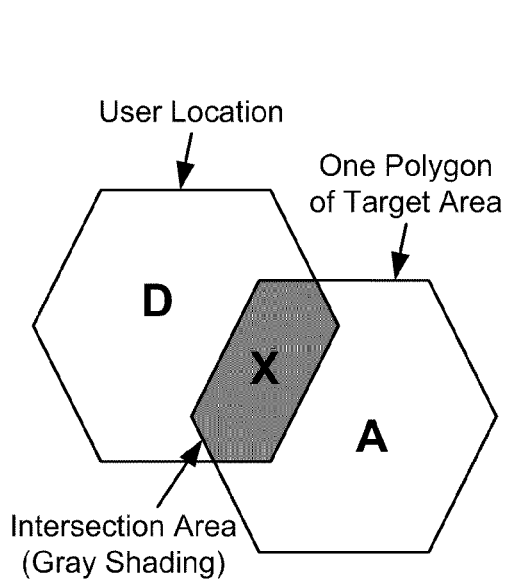

FIG. 4B shows evaluation of the location and time criterion in FIG. 4A for a unit-polygon case. In this example, the user location may be determined based on the location log and may be translated to polygon D. The user may be located in polygon D during the specific duration in the past two weeks with probability of 100%. Polygon D for the user location may be compared against polygon A for the target area. An intersection area X corresponds to the portion of polygon D that overlaps polygon A and is shown with shading in FIG. 4B. Area X may be 30% of the total area of polygon D, which may mean that the user is in the area defined by polygon A with a probability of 30%. This 30% probability is less than the 50% probability required by the location and time criterion.

Figure 4C:
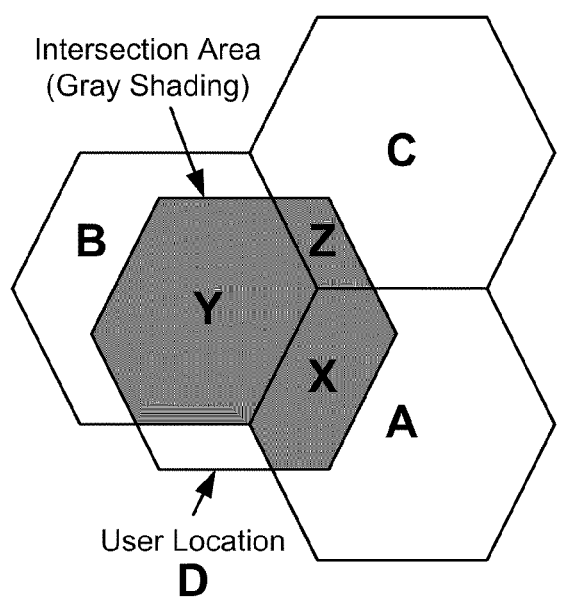

FIG. 4C shows evaluation of the location and time criterion in FIG. 4A for a multi-polygon case. Polygon D for the user location may be compared against polygons A, B and C for the target area. An intersection area X corresponds to the portion of polygon D that overlaps polygon A. An intersection area Y corresponds to the portion of polygon D that overlaps polygon B. An intersection area Z corresponds to the portion of polygon D that overlaps polygon C. Intersection areas X, Y and Z may be 90% of the total area of polygon D, which may mean that the user is in the target area defined by the union of polygon A OR B OR C with a probability of 90%. This 90% probability is greater than the 50% probability required by the location and time criterion, which means that the location and time criterion is satisfied.

As shown in FIGS. 4A to 4C, a location and time criterion may be evaluated with an iterative process that (i) compares a polygon for the user location against each polygon for a target area and (ii) accumulates the probability corresponding to the percentage of intersection between the two polygons. The process may be repeated until all polygons for the target area have been considered or the desired probability is reached.

In one design, an algorithm to evaluate a location and time criterion may be implemented with the following pseudo code.

```
10    polygon_set = shape1 ∪ ... cc1 ∪ ... NameArea1 ∪ ...
      zip1 ∪ ... CellTargetArea1 ∪ ...
20    if (presence_or_absence == ABSENCE) {
30        polygon_set = COMPLEMENT(polygon_set);
40    }
50    (start_time_ptr, end_time_ptr) =
      split_log_entries_if_needed( );
60    sum_probability = 0.0;
70    for ( i = start_time_ptr; i != end_time_ptr; i ++) {
80        intersection_area = user_location{i} ∩ polygon_set
90        time_fragment = time_duration{i} / (end_time –
          start_time);
100       presence_fragment = AREA(intersection_area) /
          AREA(user_location{i})
110       net_probability = time_fragment * presence_fragment;
120       sum_probability = sum_probability + net_probability;
130   }
140   return (sum_probability > presence_or_absence_probability);
```

In line 10 of the above pseudo code, a target area referred to as "polygon_set" may be defined based on a union (denoted by symbol "∪") of all areas of different types used to define the target area. In lines 20 to 40, the target area may be complemented if the location and time criterion is defined as the user being absent from (instead of present in) the target area. The time period covered by the location and time criterion may be given by a start time and an end time. In line 50, the entries in the location log may be split, if necessary, so that only entries within the time period covered by the location and time criterion are considered. A variable referred to as "sum_probability" may store the accumulated probability of the user being within the target area and may be initialized to zero in line 60.

Lines 70 to 130 cover a loop to evaluate each entry in the location log within the time period covered by the location and time criterion. For each entry, an intersection area between the user location polygon for that entry and the target area may be determined in line 80. The percentage of time covered by the entry versus the time period for the location and time criterion may be determined in line 90. The amount/percentage of overlap between the user location polygon and the target area may be determined in line 100. The probability of the user being within the target area, given the user location polygon and the time duration for the entry, may be computed in line 110. The accumulated probability of the user being within the target area may be updated with the probability computed for the entry. The process in lines 80 to 120 may be repeated for each log entry to be evaluated.

After evaluating all log entries within the time period covered by the location and time criterion, the accumulated probability may be compared against the specified presence or absence probability for the location and time criterion in line 140. The result of the comparison may be provided as the result for the location and time criterion.

In another design, the location log may be converted to a histogram, e.g., as described above for FIG. 3. Each histogram entry may include a polygon and a probability of the user being within the polygon and may be given as {polygon (i), probability(i)}. The sum of the probabilities for all histogram entries may be equal to one, or $$\sum_i \text{probability}\{i\} = 1.$$

The polygons for the histogram entries may be non-overlapping so that polygon {i}∪polygon {j}=Null, for i≠j. The histogram entries may be evaluated against the target area in similar manner as described above for the pseudo code.

As noted above, a target area may be converted to polygons to facilitate evaluation of a location and time criterion. A target area may be defined based on one or more of the formats described above. For certain broadcast information (e.g., advertisements), queries based on zip codes may be particularly desirable because U.S. census data may provide demographics and income levels for each zip code. In one design, a zip code translation table may be used to translate zip codes to polygons. The translation table may receive a zip code for a target area and may provide one or more polygons corresponding to the zip code. In general, a translation table may be used to convert an area of a first format into an area of a second format. The first and second formats may each be any of the formats described above or some other format.

In one design, a master translation table may be stored in a network entity or may be accessible to the network entity, e.g., stored in location database 142 and accessible by location server/center 140 in FIG. 1. The master translation table may include entries for all areas of interest, e.g., for the overall coverage of a wireless network and/or a broadcast network. Terminals may send queries with target areas in the first format to the network entity, which may provide areas in the second format to the terminals.

In another design, a translation table may be stored in terminal 110. This translation table may include entries for only the user's local region and may be a small subset of the master translation table. This translation table may be provisioned on terminal 110 or downloaded to the terminal periodically or based on its past, present and/or future location. The translation table may be subsetted according to a location query, downloaded on demand, and cached using a caching protocol such as Hypertext Transfer Protocol (HTTP). The terminal may query the translation table to obtain areas of the desired format.

The algorithm given by the pseudo code above may be used to evaluate location and time criteria having target areas given in any format and user location given in any format. The target areas and/or the user location may be converted to a selected format with one or more translation tables. In one design, the target areas may be converted to the same format as the user location. In another design, the user location may be converted to the same format as the target areas. In yet another design, the target areas and the user location may both be translated to a selected format, which may be different from the formats for the target areas and the user location. For all designs, the algorithm may operate on areas in the selected format instead of polygons. For example, all references to polygons in the pseudo code may be replaced with units of areas in the selected format, e.g., with zip code area, sector area, etc. The algorithm may treat the location log as either a zip code log or a sector log by fetching user location through the translation table.

The use of sector IDs or zip codes for target areas and user location may avoid the need for geographic calculations and may be sufficiently accurate for many applications. In one design, terminal 110 may maintain a location log of sector IDs of serving sectors with which terminal 110 was communicating or camping on, e.g., as described above. The target areas for location and time criteria may also be given by a set of sector IDs. The algorithm given by the pseudo code above may be simplified when sector IDs are used for the user location and the target areas. In particular, the computation of the intersection area between a polygon for the user location and a target area may be replaced with a comparison between the sector ID for the user location and the sector IDs for the target area. The presence fragment may be assumed to be equal to 1.0 if there is a match or equal to 0.0 if there is no match. The computation may be simplified by the use of sector IDs for user location and target areas.

A location and time criterion may be defined to cover user location in the past, e.g., whether a user was in the vicinity of a shopping mall for a specific time duration in the last two weeks. In this case, appropriate entries in the location log may be used to evaluate the location and time criterion, as described above.

A location and time criterion may be defined to cover user location in the future, e.g., whether a user will be in the vicinity of a shopping mall for a specific time duration next week. The user location in the future may be predicted in various manners. In one design, future user location may be predicted based on past user location. This may be achieved by translating or shifting the location log forward in time such that the translated location log covers the time period for a location and time criterion. For example, to determine whether the user will be within a given target area in a given time period X in the future, the location log may be shifted by a minimum number of weeks such that time period X is covered by the recent past in the translated location log. In another design, information from calendars and/or appointment books may be used to predict future user location. For example, the user may mark an upcoming vacation or a business trip in a particular city in an appointment book. This information may be used to ascertain the user's location during the period of the trip. The future user location may also be predicted in other manners.

Location and time criteria covering future user location may also be converted into location and time criteria covering past user location. For example, a location and time criterion querying whether a user will be in the vicinity of a shopping mall next week may be converted to a location and time criterion querying whether the user was in the vicinity of the shopping mall in one or more most recent weeks. The presence of the user in the vicinity of the shopping mall in the recent past may be indicative of higher likelihood of the user being present in the vicinity in the future.

Broadcast information and broadcast metadata may be sent in various manners. In one design, broadcast information and broadcast metadata may be sent via broadcast service delivery in accordance with OMA Mobile Broadcast Services (BCAST) standard, which is described in publicly available documents OMA-TS-BCAST_Services-V1_20090212-A, OMA-TS-BCAST_Service_Guide-V1_0-20090212-A, and OMA-TS-BCAST_Distribution-V1_0-20090212-A.

In one design, broadcast metadata may be sent in a service guide. The service guide may include an element that may be used to specify parameters for location and time based filtering of associated broadcast information. If a match occurs, then a terminal may give higher priority to receiving and displaying the associated broadcast information to the user.

Figure 5:
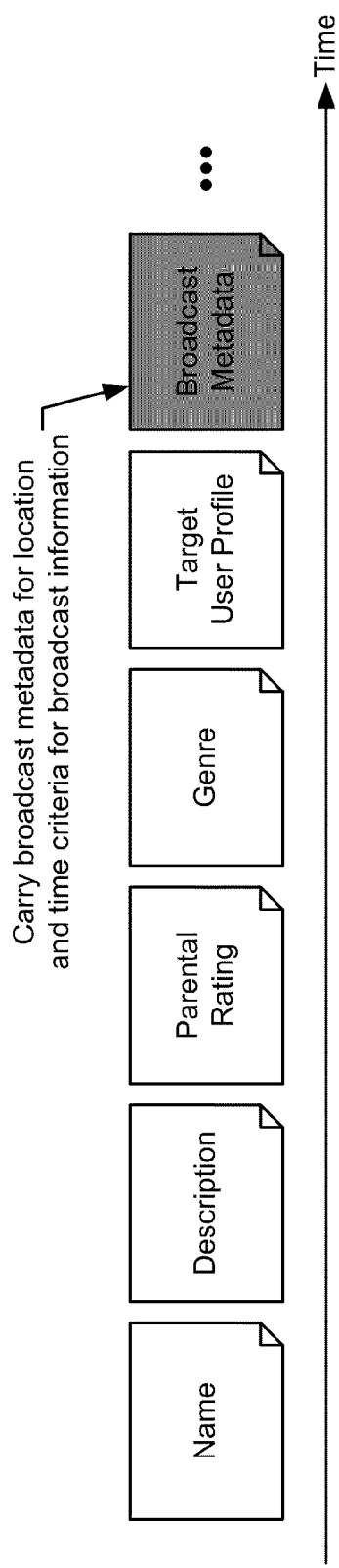
FIG. 5 shows transmission of a service guide with broadcast metadata.

FIG. 5 shows an exemplary transmission of a service guide that carries metadata such as program description, rating and genre information, and target location and time criteria. For OMA BCAST Service Guide, the component as shown represents either a Service fragment or a Content fragment. A Service fragment describes a broadcast service, which may be regarded as a "TV channel", whereas a Content fragment describes individual content items or "programs" carried on the broadcast service. A broadcast program (or content item) may be a film clip, a TV show, news bulletin, or other type of broadcast information with a particular transmission schedule. The same Service or Content fragment may also carry broadcast metadata, e.g., location and time criteria for the associated broadcast service or content that may be sent after this fragment. Although not shown in FIG. 5, the broadcast metadata may include other information such as language, subject categories (e.g., weather, news, traffic related, sports, emergency related, advertisement, etc.), media type (e.g., text, video, image, etc.), duration, size, transmission schedule, and/or other information related to the associated broadcast information.

The location and time criteria described herein may allow for transmission of broadcast information and/or broadcast metadata prior to an event related to the broadcast information. The broadcast information may be presented to the user at the time of reception and/or at later times. Delivery time of broadcast information (e.g., for advertisements, alerts, etc.) may thus be decoupled from presentation time.

Figure 6:
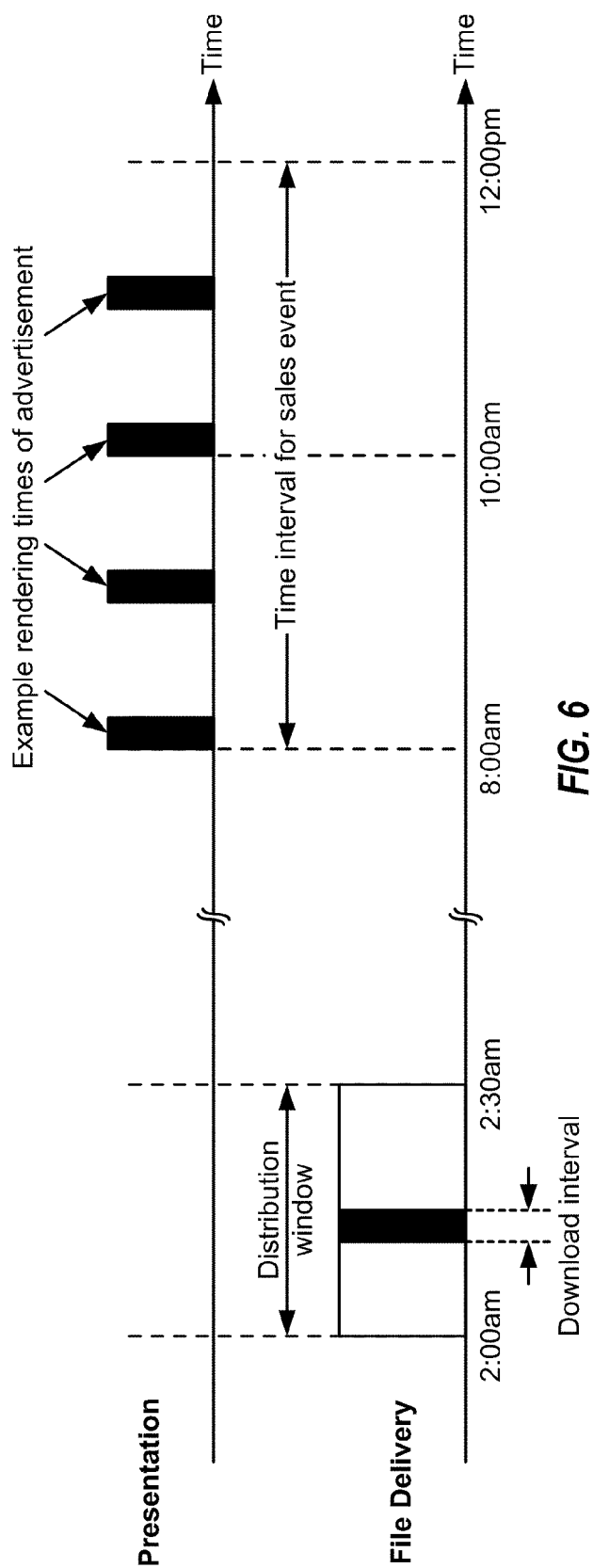
FIG. 6 shows transmission and presentation of broadcast information.

FIG. 6 shows exemplary transmission and presentation of broadcast information containing an advertisement of a sales event occurring from 8:00 am to 12:00 pm on a given Saturday. In this example, broadcast information and broadcast metadata for the advertisement may be sent during a distribution window prior to the sales event. This distribution window may be selected to improve utilization of network resources. In the example shown in FIG. 6, the distribution window is between 2:00 am and 2:30 am during off-peak traffic hours on Saturday. A terminal may download the broadcast metadata and broadcast information during the distribution window. If there is a match for the location and time criteria in the broadcast metadata, then the broadcast information may be presented to the user prior to and/or during the sales event.

Sending the broadcast information and broadcast metadata ahead of the sales event may (i) avoid or reduce broadcasting during the sales event, which may occur during peak traffic hours, and (ii) give users more advance notice of the sales event. If the advertisement is sent during the sales event itself, then the cost for sending the advertisement may be higher and the advance notice to users may be less. Hence, there may be an advantage to sending the advertisement ahead of time, which may be filtered with more precise location and time criteria in the broadcast metadata.

Figure 7:
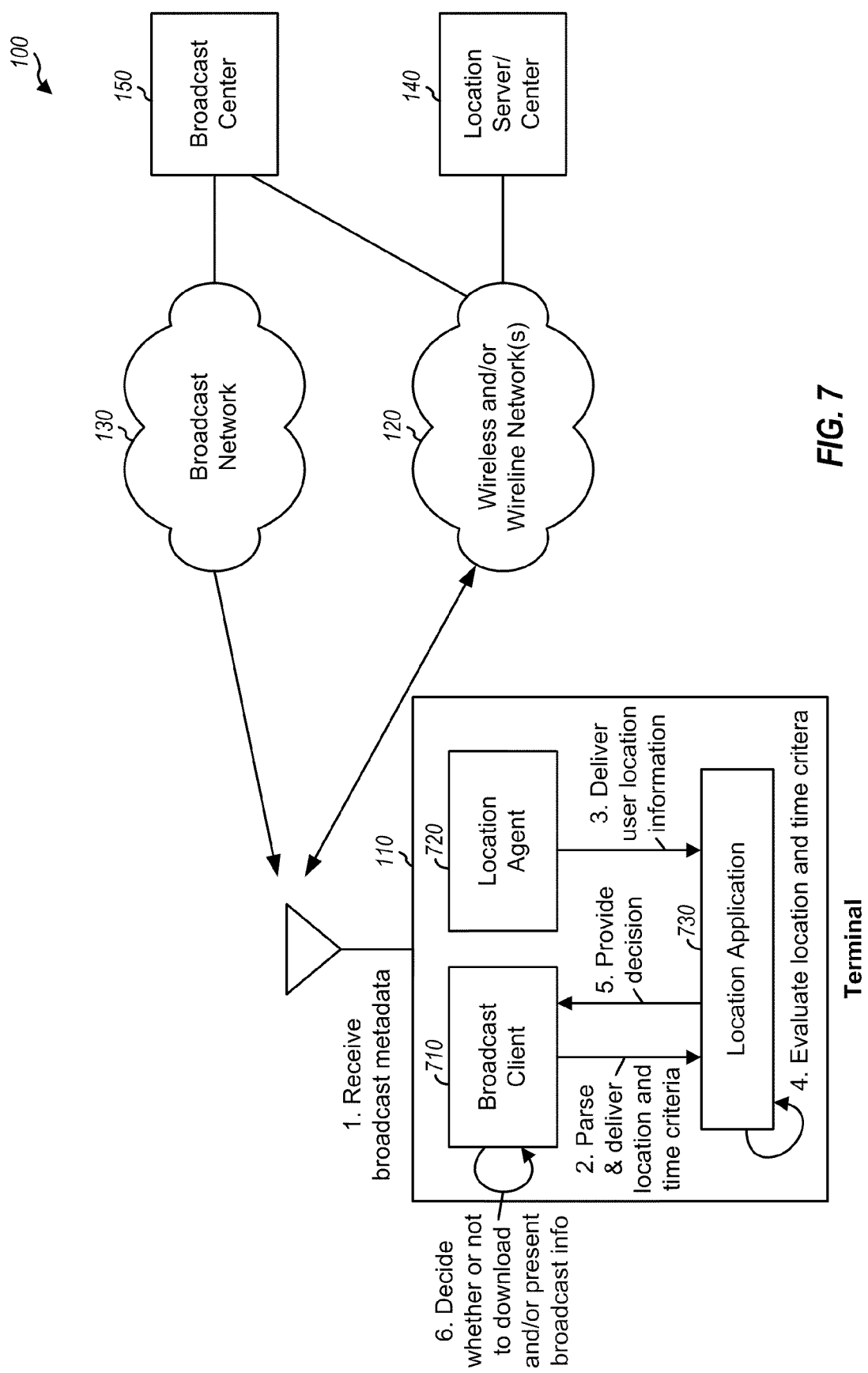
FIG. 7 shows a design of location and time based filtering.

FIG. 7 shows a design of location and time based filtering for broadcast information. Terminal 110 may receive a service guide with broadcast metadata (step 1). A broadcast client 710 within terminal 110 may receive the broadcast metadata, extract pertinent location and time criteria from the broadcast metadata, and provide the location and time criteria to a location application 730 (step 2). Broadcast client 710 may also parse the location and time criteria and may pass target areas and filter rules for the location and time criteria to location application 730.

A location agent 720 may periodically obtain the location of terminal 110, which may be given by sector ID, a geographic coordinate, or in some other format. Location agent 720 may provide the location of terminal 110 to location application 730 (step 3). Location application 730 may maintain a location log for the user location. Location application 730 may also predict future user location based on past user location, when needed, as described above. Location application 730 may evaluate the location and time criteria received from broadcast client 710 based on the location log (step 4). For example, location application 730 may compute the probability of location behavior based on the target areas and filter rules and further using the location log. Location application 730 may implement the algorithm given by the pseudo code above or some other algorithm.

Location application 730 may provide the result or decision of the location and time criteria to broadcast client 710 (step 5). Broadcast client 710 may determine whether to download and/or present the associated broadcast information based on the decision from location application 730 (step 6). Broadcast client 710 may thus selectively download broadcast information based on the past, present, and/or future location of terminal 110.

The location and time based filtering techniques described herein may be used for various applications. For example, the techniques may be used for one or more of the following:
 a. Location targeted advertisements in advance—e.g., advertisement of gas discount sale targeted at passing commuters and local residents and workers,
 b. Disaster warnings—e.g., warn travelers to some destination of a wildfire there,
 c. Weather advisory—e.g., advise commuters of heavy rain in certain areas,
 d. Traffic advisory—e.g., advance commute re-routing (manual or automatic) based on heavy traffic or road/lane closure on normal commute route,
 e. Home news while away from home—continue to receive high priority home news based on previous home location history,
 f. Selective shopping mall advertisements—receive advertisements for areas in a shopping mall that a shopper either has not visited or is currently close to, e.g. filter into two separate queues, and
 g. Vacationer advertisements—e.g., receive dining and entertainment advertisements related to an area a user is staying, while able to sightsee away from this area during the daytime.

Figures 8, 9:
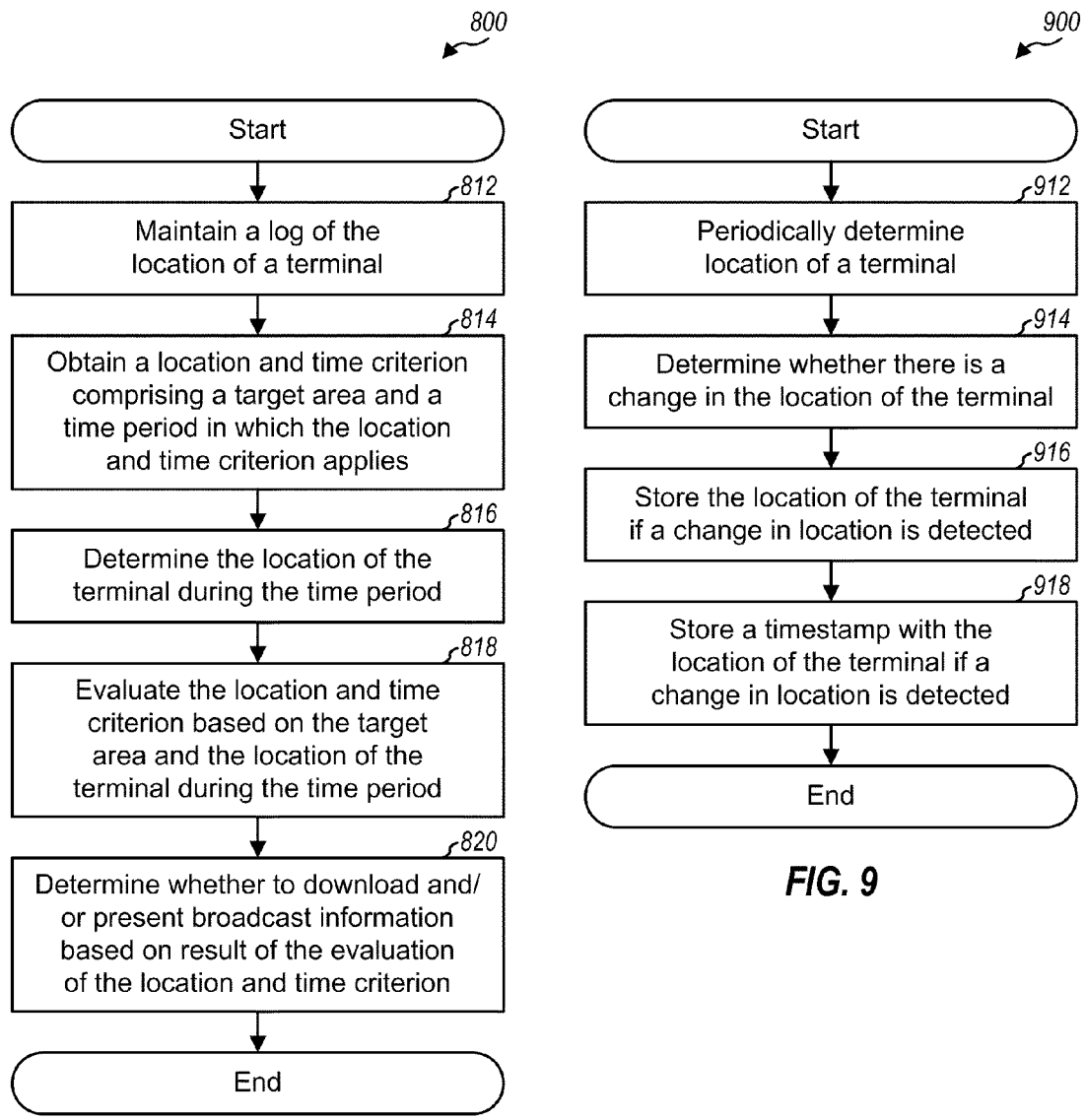
FIG. 8 shows a process for performing location and time based filtering.
FIG. 9 shows a process for performing location logging.

FIG. 8 shows a design of a process 800 for performing location and time based filtering. Process 800 may be performed by a terminal (as described below) or by some other entity. The terminal may maintain a log of its location (block 812). The terminal may obtain a location and time criterion comprising a target area and a time period in which the location and time criterion applies (block 814). The terminal may determine its location during the time period, e.g., based on the log (block 816). The terminal may evaluate the location and time criterion based on the target area and its location during the time period (block 818). The location and time criterion may further comprise a target probability for the terminal being present in the target area or absent from the target area and may be expressed as shown in equation (2). The location and time criterion may be evaluated based further on the target probability. The terminal may determine whether to download and/or present broadcast information based on the result of the evaluation of the location and time criterion (block 820).

In one design of block 816, the terminal may determine at least one sector ID for the target area. The terminal may also determine one or more sector IDs for its location during the time period. The terminal may evaluate the location and time criterion based on the at least one sector ID for the target area and the one or more sector IDs for its location.

In another design of block 816, the terminal may determine at least one polygon for the target area. The terminal may also determine one or more polygons for its location during the time period. The terminal may evaluate the location and time criterion based on the at least one polygon for the target area and the one or more polygons for its location.

In one design, the terminal may obtain at least one entry for its location from the location log. The terminal may determine the probability of it being inside or outside the target area for each log entry. The terminal may accumulate at least one probability for the at least one log entry to obtain an overall probability of it being inside or outside the target area, e.g., as shown by the pseudo code above.

The terminal may determine the target area based on a union of one or more areas, which may be given in one or more formats. The terminal may convert the target area and/or its location to a selected format. The selected format may represent areas based on sector ID, zip code, etc. The terminal may download information for a translation table used to convert the target area and/or its location to the selected format. The terminal may evaluate the location and time criterion based on the target area and its location in the selected format.

In one design, the terminal may predict its future location based on its past location. For example, the terminal may translate its past location by an amount of time determined based on the time period for the location and time criterion. The terminal may evaluate the location and time criterion based on its predicted future location.

FIG. 9 shows a design of a process 900 for logging location. Process 900 may be performed by a terminal (as described below) or by some other entity. The terminal may periodically determine its location (block 912). The terminal may determine whether there is a change in its location (block 914). The terminal may store its location in a location log if a change in location is detected (block 916). The terminal may also store a timestamp with its location if a change in location is detected (block 918).

In one design of block 912, the terminal may determine its location in each time interval of a particular duration, e.g., as shown in FIG. 2. The terminal may also determine its location during paging slots in which the terminal detects for pages from a wireless network, e.g., as also shown in FIG. 2. The time interval in which the location of the terminal is determined may cover a particular number of paging cycles, which may reduce the number of entries to store for the location of the terminal.

In one design, the terminal may periodically determine its serving sector, which may be used to estimate the location of the terminal. The terminal may determine whether there is a change in serving sector for the terminal. The terminal may store a sector ID of the serving sector and a timestamp if a change in serving sector is detected.

In one design, the terminal may determine a histogram of its location for a particular time duration. The histogram may comprise a plurality of entries. Each entry may comprise an area and a percentage of time that the terminal is within the area.

The terminal may compress entries for its location in the location log to remove redundant location information that is common for the entries being compressed. The terminal may also encrypt entries for its location. In one design, the terminal may encrypt the entire location log except for the last entry. The terminal may decrypt the location log and store the decrypted location information in local memory when evaluating a location and time criterion. The terminal may also perform encryption and decryption in other manners.

Figure 10:
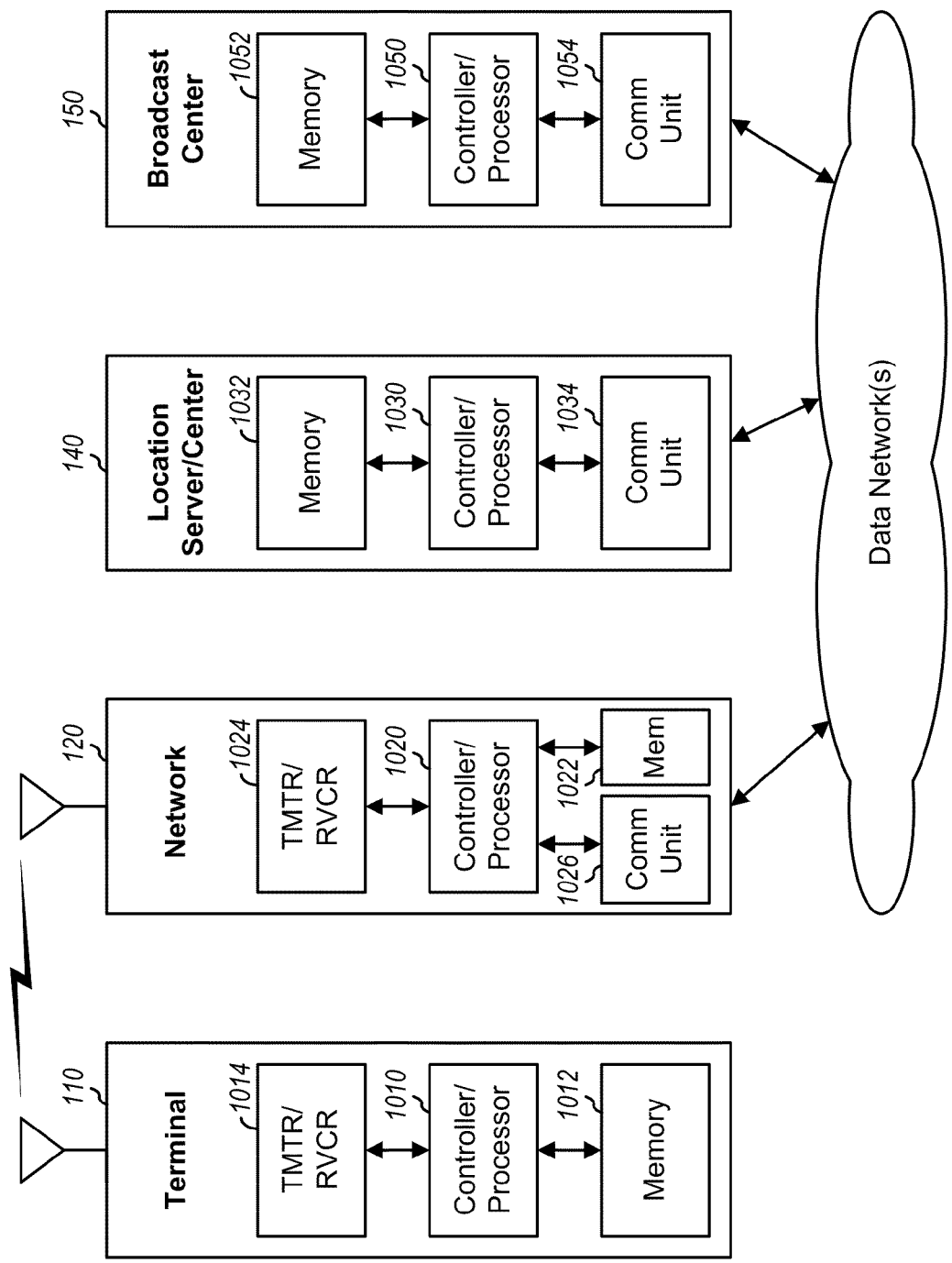
FIG. 10 shows a block diagram of a terminal, a network, a location server/center, and a broadcast center.

FIG. 10 shows a block diagram of a design of terminal 110, network 120, location server/center 140, and broadcast center 150 in FIG. 1. For simplicity, FIG. 10 shows (i) one controller/processor 1010, one memory 1012, and one transmitter/receiver (TMTR/RCVR) 1014 for terminal 110, (ii) one controller/processor 1020, one memory (Mem) 1022, one transmitter/receiver 1024, and one communication (Comm) unit 1026 for network 120, (iii) one controller/processor 1030, one memory 1032, and one communication unit 1034 for location server/center 140, and (iv) one controller/processor 1050, one memory 1052, and one communication unit 1054 for broadcast center 150. In general, each entity may include any number of controllers, processors, memories, transceivers, communication units, etc.

On the downlink, base stations in network 120 may transmit traffic data, broadcast information, broadcast metadata, signaling, and pilot to terminals within their coverage areas. These various types of data may be processed by processor 1020, conditioned by transmitter 1024, and transmitted on the downlink. At terminal 110, the downlink signals from the base stations may be received via an antenna, conditioned by receiver 1014, and processed by processor 1010 to recover the various types of information sent by the base stations. Processor 1010 may perform or direct process 800 in FIG. 8, process 900 in FIG. 9, and/or other processes for the techniques described herein. Memories 1012 and 1022 may store program codes and data for terminal 110 and network 120, respectively. On the uplink, terminal 110 may transmit traffic data, signaling, and pilot to the base stations in network 120. These various types of data may be processed by processor 1010, conditioned by transmitter 1014, and transmitted on the uplink. At network 120, the uplink signals from terminal 110 and other terminals may be received and conditioned by receiver 1024 and further processed by processor 1020 to recover the various types of information sent by the terminal. Network 120 may communicate with other network entities via communication unit 1026.

Broadcast network 130 may be implemented with one or more transmitters, one or more controllers/processors, one or more memories, and one or more communication units that may operate in similar manner as those for network 120.

Within location server/center 140, processor 1030 may perform positioning for terminals, provide assistance data to terminals, support location services for terminals and other LCS clients, etc. Memory 1032 may store program codes and data for the location center. Communication unit 1034 may allow location server/center 140 to communicate with other entities.

Within broadcast center 150, processor 1050 may generate and send broadcast information and broadcast metadata. Memory 1052 may store program codes and data for the broadcast center. Communication unit 1054 may allow the broadcast center to communicate with other entities.

Those of skill in the art would understand that information and signals may be represented using any of a variety of different technologies and techniques For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of performing location and time based filtering, comprising:
   obtaining, by a terminal, a location and time criterion comprising a target area and a time period in which the location and time criterion applies;
   determining, by the terminal, location of the terminal during the time period; and
   evaluating, by the terminal, the location and time criterion based, at least in part, on the target area and the location of the terminal during the time period, said evaluating the location and time criterion comprising:
      determining at least one polygon for the target area,
      determining one or more polygons for the location of the terminal during the time period, and
      evaluating the location and time criterion based, at least in part, at least in part on the at least one polygon for the target area and the one or more polygons for the location of the terminal.

2. The method of claim 1, wherein the location and time criterion further comprises a target probability for the terminal being present in the target area or absent from the target area, and wherein the location and time criterion is evaluated based further on the target probability.

3. The method of claim 1, wherein the location and time criterion is expressed as:

$$LR = PA \text{ at } L \text{ during } D,$$

where L denotes the target area for the location and time criterion,

PA denotes a presence or absence requirement for the location and time criterion, D denotes the time period for the location and time criterion, and LR denotes the location and time criterion.

4. The method of claim 1, wherein at least one of the at least one polygon for the target area or at least one of the one or more polygons for the location of the terminal during the time period comprises a sector ID.

5. The method of claim 1, wherein the at least one polygon for the target area and the one or more polygons for the location of the terminal are evaluated with intersection operations and joint probability calculations.

6. The method of claim 1, further comprising:
   maintaining a log of the location of the terminal, and wherein the location of the terminal during the time period is determined based, at least in part, on the log.

7. The method of claim 1, wherein the determining the location of the terminal during the time period comprises obtaining at least one entry for the location of the terminal from a location log, and wherein the evaluating the location and time criterion comprises
   determining probability of the terminal being inside or outside the target area for each of the at least one log entry, and
   accumulating at least one probability for the at least one log entry to obtain an overall probability of the terminal being inside or outside the target area.

8. The method of claim 1, further comprising:
   determining the target area based, at least in part, on a union of a plurality of areas given in at least one format.

9. The method of claim 1, further comprising:
   converting the target area, or the location of the terminal, or both to a selected format.

10. The method of claim 9, wherein the selected format represents areas based, at least in part, on sector identity (ID) or zip code.

11. The method of claim 9, further comprising:
    downloading information for a translation table used to convert the target area, or the location of the terminal, or both to the selected format.

12. The method of claim 1, further comprising:
    predicting future location of the terminal based, at least in part, on past location of the terminal, and wherein the location and time criterion is evaluated based, at least in part, on the predicted future location of the terminal.

13. The method of claim 12, wherein the predicting the future location of the terminal comprises translating the past location of the terminal by an amount of time determined based, at least in part, on the time period for the location and time criterion.

14. The method of claim 1, further comprising:
    determining whether to download broadcast information, or to present the broadcast information, or both based, at least in part, on results of the evaluation of the location and time criterion.

15. An apparatus for performing location and time based filtering, comprising:
    means for obtaining, by a terminal, a location and time criterion comprising a target area and a time period in which the location and time criterion applies;
    means for determining, by the terminal, location of the terminal during the time period; and
    means for evaluating, by the terminal, the location and time criterion based, at least in part, on the target area and the location of the terminal during the time period, the means for evaluating the location and time criterion comprising:
means for determining at least one polygon for the target area,
means for determining one or more polygons for the location of the terminal during the time period, and
means for evaluating the location and time criterion based at least in part on the at least one polygon for the target area and the one or more polygons for the location of the terminal.

16. The apparatus of claim 15, wherein the location and time criterion further comprises a target probability for the terminal being present in the target area or absent from the target area, and wherein the location and time criterion is evaluated based further on the target probability.

17. The apparatus of claim 15, wherein at least one of the at least one polygon for the target area or at least one of the one or more polygons for the location of the terminal during the time period comprises a sector ID.

18. The apparatus of claim 15, further comprising:
means for maintaining a log of the location of the terminal, and wherein the location of the terminal during the time period is determined based, at least in part, on the log.

19. The apparatus of claim 15, wherein the means for determining the location of the terminal during the time period comprises means for obtaining at least one entry for the location of the terminal from a location log, and wherein the means for evaluating the location and time criterion comprises
means for determining probability of the terminal being inside or outside the target area for each of the at least one log entry, and
means for accumulating at least one probability for the at least one log entry to obtain an overall probability of the terminal being inside or outside the target area.

20. An apparatus for performing location and time based filtering, comprising:
at least one processor configured to obtain, by a terminal, a location and time criterion comprising a target area and a time period in which the location and time criterion applies, to determine, by the terminal, location of the terminal during the time period, to evaluate, by the terminal, the location and time criterion based, at least in part, on the target area and the location of the terminal during the time period, to determine at least one sector identity (ID) for the target area, to determine one or more sector IDs for the location of the terminal during the time period, and to evaluate the location and time criterion based at least in part on the at least one sector ID for the target area and the one or more sector IDs for the location of the terminal, wherein at least one of the at least one sector ID for the target area or at least one of the one or more sector IDs for the location of the terminal during the time period is indicative of a polygonal shape.

21. The apparatus of claim 20, wherein the location and time criterion further comprises a target probability for the terminal being present in the target area or absent from the target area, and wherein the at least one processor is configured to evaluate the location and time criterion based further on the target probability.

22. The apparatus of claim 20, wherein the at least one processor is configured to maintain a log of the location of the terminal and to determine the location of the terminal during the time period based, at least in part, on the log.

23. The apparatus of claim 20, wherein the at least one processor is configured to obtain at least one entry for the location of the terminal from a location log, to determine probability of the terminal being inside or outside the target area for each of the at least one log entry, and to accumulate at least one probability for the at least one log entry to obtain an overall probability of the terminal being inside or outside the target area.

24. A non-transitory computer-readable medium comprising:
code for causing at least one computer to obtain, by a terminal, a location and time criterion comprising a target area and a time period in which the location and time criterion applies,
code for causing the at least one computer to determine, by the terminal, location of the terminal during the time period, and
code for causing the at least one computer to evaluate, by the terminal, the location and time criterion based, at least in part, on the target area and the location of the terminal during the time period, to determine at least one sector identity (ID) for the target area, to determine one or more sector IDs for the location of the terminal during the time period, and to evaluate the location and time criterion based at least in part on the at least one sector ID for the target area and the one or more sector IDs for the location of the terminal, wherein at least one of the at least one sector ID for the target area or at least one of the one or more sector IDs for the location of the terminal during the time period is indicative of a polygonal shape.

25. A method of logging location information, comprising:
periodically determining a location of a terminal;
determining whether there is a change in the location of the terminal;
storing the location of the terminal in response to a change in location being detected; and
encrypting entries for past location of the terminal in a location log;
wherein the periodically determining the location of the terminal comprises at least one of:
during paging slots in which the terminal detects for pages from a wireless network; or
determining the location of the terminal in each logging interval of a particular duration, the logging interval spanning at least two paging slots.

26. The method of claim 25, further comprising:
storing a timestamp with the location of the terminal if a change in location is detected.

27. The method of claim 25, wherein the periodically determining the location of the terminal comprises periodically determining a serving sector for the terminal, and wherein the location of the terminal is determined based, at least in part, on the serving sector.

28. The method of claim 27, wherein the determining whether there is a change in the location of the terminal comprises determining whether there is a change in serving sector for the terminal, and wherein the storing the location of the terminal comprises storing a sector identity (ID) of the serving sector if a change in serving sector is detected.

29. The method of claim 25, further comprising:
determining a histogram of the location of the terminal for a particular time duration, the histogram comprising a plurality of entries, each entry comprising an area and a percentage of time the terminal is within the area.

30. The method of claim 25, further comprising:
compressing entries for past location of the terminal to remove redundant location information common for the entries.

31. An apparatus for logging location information, comprising:
means for periodically determining a location of a terminal;
means for determining whether there is a change in the location of the terminal;
means for storing the location of the terminal in response to a change in location being detected;
means for storing a timestamp with the location of the terminal if a change in location is detected; and
means for encrypting entries for past location of the terminal in a location log.

32. The apparatus of claim 31, wherein the means for periodically determining the location of the terminal comprises means for determining the location of the terminal during paging slots in which the terminal detects for pages from a wireless network.

33. The apparatus of claim 31, wherein the means for periodically determining the location of the terminal comprises means for periodically determining a serving sector for the terminal, wherein the means for determining whether there is a change in the location of the terminal comprises means for determining whether there is a change in serving sector for the terminal, and wherein the means for storing the location of the terminal comprises means for storing a sector identity (ID) of the serving sector if a change in serving sector is detected.

34. An apparatus for logging location information, comprising:
at least one processor configured to periodically determine a location of a terminal, determine whether there is a change in the location of the terminal, store the location of the terminal in response to a change in location being detected, store a timestamp with the location of the terminal if a change in location is detected; and compress entries for past location of the terminal to remove redundant location information common for the entries.

35. A non-transitory computer-readable medium for logging location information, comprising:
code for causing at least one computer to periodically determine a location of a terminal;
code for causing the at least one computer to determine whether there is a change in the location of the terminal;
code for causing the at least one computer to store the location of the terminal in response to a change in location being detected;
code for causing the at least one computer to store a timestamp with the location of the terminal if a change in location is detected; and
code for causing the at least one computer to compress entries for past location of the terminal to remove redundant location information common for the entries.

36. The method of claim 1, wherein the time period corresponds to a past or future period of time.

37. The method of claim 1, wherein the time criterion represents the time period as a start time and an end time.

38. The method of claim 1, wherein the determining the location of the terminal during the time period comprises:
determining the location of the terminal during the time period based, at least in part, on a log of locations of the terminal.

39. The method of claim 25, wherein the periodically determining, the determining, and the storing are performed by the terminal.

40. The non-transitory computer-readable medium of claim 35, wherein the code for causing the at least one computer to periodically determine the location of the terminal further comprises code for causing the at least one computer to determine the location of the terminal during paging slots in which the terminal detects for pages from a wireless network.

41. The non-transitory computer-readable medium of claim 35, wherein the code for causing the at least one computer to periodically determine the location of the terminal further comprises code for causing the at least one computer to periodically determine a serving sector for the terminal, wherein the code for causing the at least one computer to determine whether there is a change in the location of the terminal comprises code for causing the at least one computer to determine whether there is a change in serving sector for the terminal, and wherein the code for causing the at least one computer to store the location of the terminal comprises code for causing the at least one computer to store a sector identity (ID) of the serving sector if a change in serving sector is detected.

42. The method of claim 4, wherein the sector ID of at least one of the at least one polygon for the target area or at least one of the one or more polygons for the location of the terminal during the time period comprises a zip code.

43. The method of claim 4, wherein the sector ID of at least one of the at least one polygon for the target area or at least one of the one or more polygons for the location of the terminal during the time period comprises a country code.

44. The method of claim 4, wherein the sector ID of at least one of the at least one polygon for the target area or at least one of the one or more polygons for the location of the terminal during the time period comprises a particular name of an area.

45. The apparatus of claim 20, wherein the at least one processor is further configured to determine the target area based, at least in part, on a union of a plurality of areas given in at least one format.

46. The non-transitory computer-readable medium of claim 24 comprising:
code for causing the at least one computer to determine whether to download broadcast information, or to present the broadcast information, or both based, at least in part, on results of the evaluation of the location and time criterion.

47. The non-transitory computer-readable medium of claim 24 comprising:
code for causing the at least one computer to convert the target area, or the location of the terminal, or both to a selected format.

48. The non-transitory computer-readable medium of claim 47, wherein the selected format represents areas based, at least in part, on sector identity (ID) or zip code.

49. The non-transitory computer-readable medium of claim 47 comprising:
code for causing the at least one computer to download information for a translation table used to convert the target area, or the location of the terminal, or both to the selected format.

\* \* \* \* \*